United States Patent

[11] 3,623,753

| [72] | Inventor | Ralph L. Henry<br>Midland, Tex. |
|---|---|---|
| [21] | Appl. No. | 883,008 |
| [22] | Filed | Dec. 8, 1969 |
| [45] | Patented | Nov. 30, 1971 |
| [73] | Assignee | Smith International, Inc.<br>Midland, Mich. |

[54] PIPE COUPLING FOR A SEALED FLUID CONDUCTOR
5 Claims, 7 Drawing Figs.

[52] U.S. Cl. .................................................. 285/330,
285/DIG. 14
[51] Int. Cl. .................................................. F16l 19/00
[50] Field of Search .................................. 285/330,
DIG. 14, 386; 64/1 C, 9, 1 R; 175/320

[56] References Cited
UNITED STATES PATENTS

| 2,109,344 | 2/1938 | Selger | 285/330 |
| 2,195,492 | 4/1940 | McDonald | 285/DIG. 15 |
| 2,314,867 | 3/1943 | Boynton | 285/330 X |
| 2,517,391 | 8/1950 | Ernestus | 285/DIG. 15 |
| 3,064,998 | 11/1962 | Syverson | 285/330 X |
| 3,361,453 | 1/1968 | Brown et al. | 285/330 X |
| 3,463,228 | 8/1969 | Hearn | 285/330 X |

*Primary Examiner*—Thomas F. Callaghan
*Attorney*—Marcus L. Bates

ABSTRACT: A pipe coupling for sealed fluid conductors comprised of first and second members having a complementary seal means and a complementary clutch means formed thereon with each member being held together by a collar. The collar has a shoulder which engages a complementary shoulder located on one member and a box which engages a pin located on the second member so as to enable a compressive force to be developed between the collar and the box, with the force being imposed upon the seal means to thereby effect the seal and at the same time transmit tension loads, while the clutch enables transmission of torque to be effected in either rotational direction.

PATENTED NOV 30 1971 3,623,753
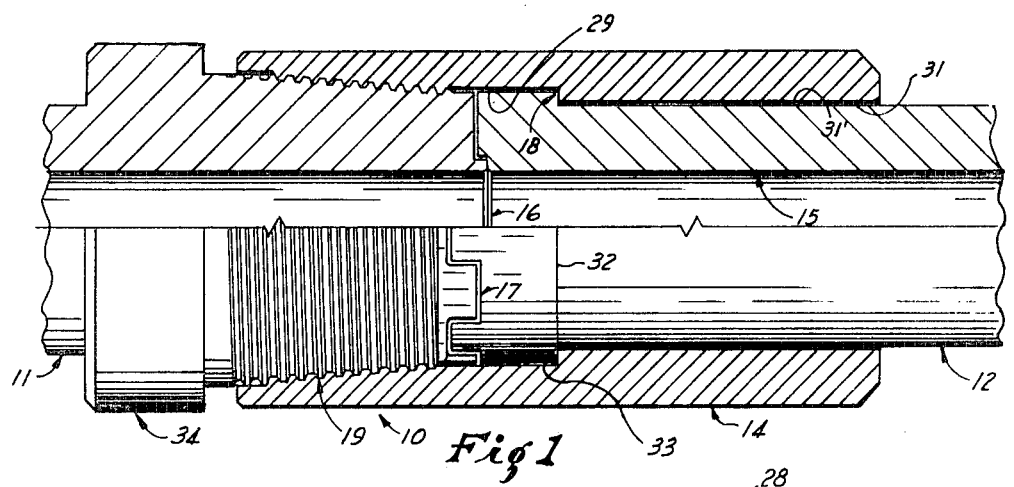
Fig 1
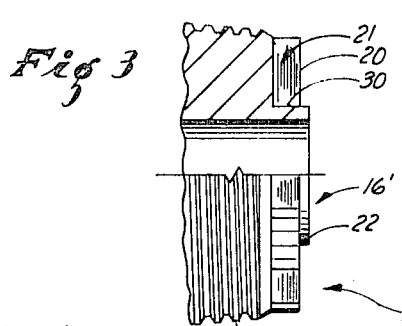
Fig 3
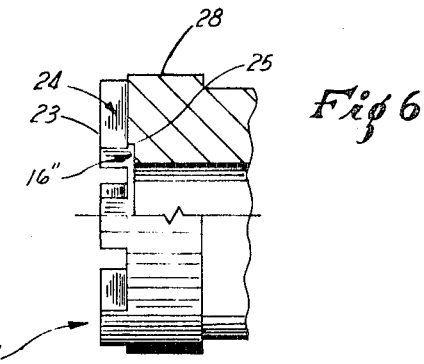
Fig 6
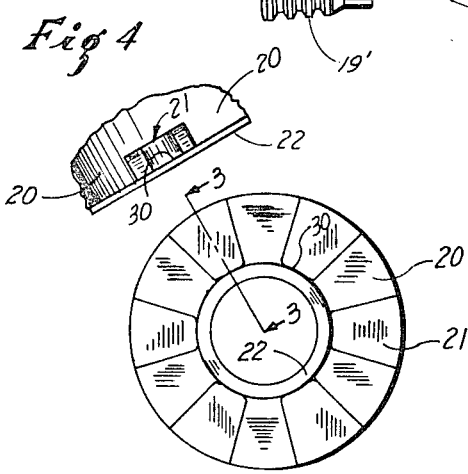
Fig 4
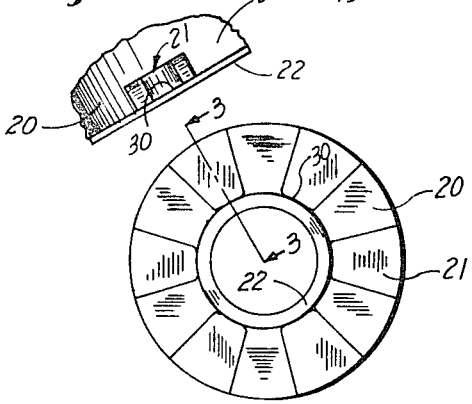
Fig 2
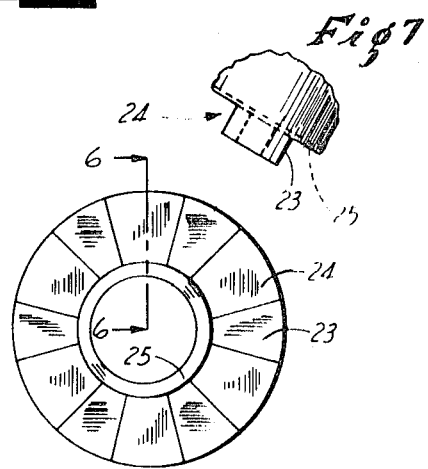
Fig 7
Fig 5
INVENTOR.
Ralph L. Henze
BY
Marcus L. Bates

3,623,753

PIPE COUPLING FOR A SEALED FLUID CONDUCTOR

BACKGROUND OF THE INVENTION

It is often desirable to be able to rotate a string of pipe and other tubular goods in either a right or left hand direction without involving the risk of unscrewing any one of the pipe joints. It is customary to rotate a drill string in a clockwise direction, and occasionally, as for example in fishing or when drilling a crooked hole, it is desirable to be able to reverse rotation of the drill string. Moreover, when penetrating certain peculiar types of formations it is desirable to be able to cyclicly reverse the direction of rotation of the bit so as to attain a more uniform borehole.

It is theoretically possible to make up drill string with sufficient thread tightness at the individual joints thereof which will permit rotation of the drill string in either direction without unscrewing any joint; however, in practice it is unusual for a Pusher to subscribe to this theory with sufficient belief whereby he will order a driller to reverse the direction of rotation of the drill string for the reason that he also believes that one of the multiplicity of joints may somehow become detached or unscrewed, and such an event is considered catastrophic in the art of borehole formation.

While it is possible for surface drilling torque values to be controlled so as to normally avoid damage to the various threaded connections of a drill string, sometime the bit, or an intermediate portion of the string, will "hang up" due to the peculiarities of the formation being penetrated. This sudden stoppage induces a torsional impact load in excess of the structural limitations of the drill string. An impact load of this nature will damage one or more of the threaded connections. Sometimes such an impact load will separate a pin from its joint, leaving the pin broken off in its box. Where the drill string is undergoing reversed direction of rotation, an impact load of this nature will cause separation of the drill string because a pin will be unscrewed from its box.

It is therefore desirable to be able to utilize threaded pipe joints of a design which provides a maximum thread life through continued usage. It is furthermore desirable to be able to effectively seal pipe joints by the employment of a pipe coupling which depends upon a seal means other than the threaded connection itself. It is also desirable to be able to transmit torsional loads by some means other than the threaded connection itself. It is further desirable to be able to rotate such a threaded connection in either a clockwise or counterclockwise direction.

SUMMARY OF THE INVENTION

The present invention is directed to a pipe coupling for use in making up joints to provide a sealed fluid conductor. The pipe coupling permits torsional loads to be transmitted by rotating the tubular goods in either a clockwise or a counterclockwise direction. This expedient is attained by the provision of a clutch means disposed between adjacent joints of pipe, and forming an integral part of each pipe member, with the clutch means being comprised of interlocking dogs and slots, with the dogs and slots being radially disposed and placed circumferentially about part of the coupling. The inside marginal edge portion of each member includes a circumferentially disposed planer surface which is parallel to the equatorial plane of the coupling, and each of which abuts each other in sealing relationship. A collar has a shoulder disposed therewithin and spaced apart from a box. One member has an outwardly directed shoulder which cooperates with the collar shoulder, while the remaining member has a pin which threadedly engages the collar threads. Accordingly, the collar, when tightened, compresses the two members together to effect the seal, to maintain the dogs and slots interlocked, and to transmit tension loads. The interlocking dogs and slots transmit torsional loads from one joint of pipe into an adjacent joint of pipe.

Accordingly, it is a primary object of this invention to provide a pipe coupling which can be rotated in either direction without imposing a torsional load upon a threaded connection.

Another object of the present invention is the provision of a pipe coupling which enables a drill string to be made up of joints of tubular goods, and wherein the drill string can be rotated in either direction without disassembling any pipe connection in the drill string.

A still further object of the present invention is the provision of an improved means by which torsional loads can be transmitted between adjacent joints of tubular goods.

Still another object of the present invention is the provision of a means for flowing fluid through tubular goods wherein the tubular goods are connected to one another by an improved pipe coupling which enables torsional loads to be transmitted between joints by a clutch means while tension loads are transmitted by a collar.

A further object of the present invention is the provision of a pipe coupling which enables a fluid conductor to be made up of a plurality of joints of pipe with the pipe coupling being interposed between adjacent joints and wherein the pipe coupling has improvements therein for transmission of torsional and tension forces, while at the same time providing a seal between the adjacent pipe joints.

The above objects are attained in accordance with the present invention by the provision of a pipe coupling comprised of two members having a seal means circumferentially disposed therein from which there radiates a clutch means for transmitting torsional loads between joints, and a collar placed thereabout for joining together the two members and for transmission of tension forces.

Other objects of the present invention will be realized by those skilled in the art upon completely digesting the following detailed description and claims, and by referring to the accompanying drawings.

BRIEF DESCRIPTION OF THE DRAWINGS

FIG. 1 is a longitudinal part cross-sectional view of a coupling made in accordance with the present invention, with some additional parts being shown in order to more clearly disclose the details thereof;

FIG. 2 is an end view of part of the coupling seen in FIG. 1;

FIG. 3 is a part cross-sectional view taken along line 3—3 of FIG. 2, with some additional parts being disclosed;

FIG. 4 is a fragmentary representation of an end portion of the pipe coupling seen in FIGS. 2 and 3;

FIG. 5 is an end view of part of the coupling seen in FIG. 1;

FIG. 6 is a part cross-sectional view taken along line 6—6 of FIG. 5, with some additional parts being disclosed; and FIG. 7 is a fragmentary representation of an end portion of the pipe coupling seen in FIGS. 5 and 6.

DETAILED DESCRIPTION OF ONE EMBODIMENT OF THE INVENTION

Referring now to FIG. 1, in conjunction with the remaining figures, there is seen disclosed a pipe coupling for a sealed fluid conductor wherein the pipe coupling is seen to have a first tubular member 11, a second tubular member 12, each of which are connected together by a collar as seen illustrated by the arrow at numeral 14. A passageway 15 is formed along the longitudinal axis of the coupling for flow of fluid in either direction therethrough.

A seal means, the interface of which is indicated by the arrow at numeral 16, prevents flow of fluid laterally through the coupling when the seal is in a compressed condition. A clutch means 17 is radially disposed outwardly about the seal means, as will be pointed out in greater detail later on. Complementary shoulders, indicated by the arrow at numeral 18, provide a means by which the threaded connection 19 can effect a seal at 16 and at the same time afford means for transferring tension loads.

The clutch 17 is seen to be made up of a plurality of spaced-apart lugs which form interlocking dogs and slots, with one series of dogs and slots being formed in a terminal end of each of the members 11 and 12. As best seen in FIGS. 2–4, the lugs or dogs 20 are formed by cutting the slots 21 within the marginal end of member 11 so as to leave the dogs radiating from a planer seal surface 22, with seal surface 22 outwardly projecting from the outermost parallel faces of the dogs.

Looking now to the complementary clutch member associated with member 12, and as best seen in FIGS. 5–7, the dogs 23 are similar to the dogs 20, and are separated from one another by slots 24 with the dogs radiating from a planer surface 25 which forms the sealing face 16'' and which receives sealing face 16' of member 11 to form the before mentioned sealed interface 16.

Looking now to FIGS. 1 and 6, the second member is seen to have a constant diameter portion 28 which is slidably received within the counterbore formed by the unthreaded portion 29 of the collar. The outer peripheral surface of member 12 includes a second constant diameter portion disposed along the limited longitudinal portion indicated by the numeral 31' so as to enable it to be received with close fitting relationship within the second illustrated constant diameter counterbore 31 of the collar. Member 12 is further provided with a shoulder 32 which is compressed by the illustrated complementary shoulder 33 of the collar with the shoulders cooperating together to form the before-mentioned shoulder innerface at 18. Enlargement 34 provides a wearing surface for receiving tubing tongs and the like, as well as reducing the likelihood of a collar being unscrewed when the direction of rotation is reversed. This is especially so where the borehole conditions impose a drag upon the string, such as the presence of "key seats" and the like. Accordingly, by oversizing the diameter of enlargement 34 with respect to the collar, the enlargement will bear against the key seat or the inside peripheral wall surface of the borehole to thereby reduce the drag which would otherwise be imposed upon the collar. For example only, the enlargement may be fabricated with an outside diameter which exceeds the outside diameter of the collar by one-eighth to one-fourth inch.

It should be noted that the dogs of each member have an outermost face which does not bottom against the innermost face of the complementary slots within which they are received. For example, the outermost face 20 of the dogs associated with member 11 stand off from the innermost face of a slot 24 of member 12, thereby leaving the small gap or interface seen at numeral 17, and accordingly, the compressive force developed between threads 19 and shoulders 32, 33 is exerted upon seal means 16.

Those skilled in the art, and having read the foregoing descriptive portion of this disclosure, will appreciate that the present invention is assembled by forming opposite end portions on a joint of tubular goods in the illustrated manner of members 11 and 12, care being taken that collar 14 is placed thereon during the fabrication. As will now be obvious to those skilled in the art, the complementary clutch components are placed in meshed relationship upon one another in the manner of FIG. 1, whereupon the collar is then torqued into the illustrated position. The seal means at innerface 16 provides a reliable, efficient sealed joint which can withstand relatively high pressures. The lugs or dogs of the clutch can be made of sufficient depth to accommodate the maximum torque which the remaining portion of the tubular goods can withstand.

It will be understood that the specific threaded connection at 19 is for purposes of illustration only, and that other threaded connections can be used thereon without departing from the present invention. Moreover, the configuration of the seal at 16 can take on a number of forms, such as for example, being V-shaped, grooved, or sloped about its entire circumference either inwardly or outwardly. The number of dogs, as well as their width and depth can be varied in order to enable the optimum transmission of torque forces from one joint of pipe to the next adjacent joint of pipe.

The present invention provides a string of pipe joints which can be rapidly made up into a string of pipe by stabbing the clutch means of one member with the clutch means of the second member, and screwing the collar into place by using conventional tools.

I claim:
1. A drill string made up of a plurality of individual joints of series connected pipe, each connected together by a pipe coupling so as to enable a drill bit to be connected to one end of the string and rotated in either a clockwise or counterclockwise direction while fluid flows longitudinally through the interior of the string to the bit, the improvement comprising:

said coupling including a first tubular member and a second tubular member, said first and second members having mating marginal end portions; one of said members having an exterior shoulder means circumferentially disposed thereabout, the other of said members having an exterior threaded surface formed thereon;

a collar having an internal shoulder portion and an internal threaded portion for engaging said exterior shoulder and said exterior threaded surface, respectively, so as to hold one said first and one said second member together;

said mating marginal end portions including a seal means and a clutch means, said clutch means being circumferentially disposed about said seal means and having a plurality of spaced-apart lugs which form interlocking dogs and slots, with said plurality of dogs and slots being formed in the marginal end of each of said first and second members so as to enable the dogs of one member to be received within the slots of the other member; said plurality of spaced-apart circumferentially disposed dogs of one member are spaced apart sufficiently to allow the dogs of the other member to be received therebetween, with the dogs having an outermost face and the slots having an innermost face; said innermost and outmost faces being spaced apart from one another when the coupling is in the operative configuration;

said seal means being circumferentially disposed inwardly of said lugs for preventing fluid flow from the interior of the member towards the lugs; said seal means includes a circumferentially extending outwardly projecting seal face formed on one member and a coacting inwardly projecting seal face formed on the other member, each seal face being coaxially disposed with respect to the central longitudinal axis of said first and second members and adapted to be sealingly compressed together when said members are joined together by said collar;

whereby members representative of said first and second members can be spaced apart, axially aligned, and integrally connected together to form an individual joint of pipe so that adjacent joints of pipe may be arranged in series relationship with a first member of one joint being mated to a second member of another joint of pipe; each said seal face of different members to be received in abutting relationship to thereby maintain the outermost portion of one said clutch spaced apart from the innermost portion of its complementary clutch member.

2. The pipe coupling of claim 1 wherein said first seal is located adjacent to and outwardly of the flow passageway and the dogs thereof radiate therefrom, while;

said second seal is located adjacent to the flow passageway and the slots radiate therefrom.

3. The pipe coupling of claim 1 wherein said collar shoulder is formed by first and second counterbores and a surface therebetween;

said shoulder of said second elongated member is slidably received within said first counterbore and abuts against said surface.

4. The pipe coupling of claim 1, and further including an abutment means circumferentially disposed about one said elongated member;

said abutment means having an outside diameter which exceeds the outside diameter of said collar.

5. A pipe coupling for sealed fluid conductors;

said pipe coupling including first and second elongated tubular members integrally affixed to one another to form opposed end portions of a joint of a fluid conductor, to enable a first elongated member to be connected to a second elongated member when joints of the fluid conductor are joined together;

said first elongated member including means forming a pin, an exterior threaded surface, a first clutch member, and means forming a first seal member which includes a circumferentially disposed planar seal surface positioned axially outwardly from said first clutch;

said second elongated member including means forming an outwardly directed shoulder, a second clutch member adapted to engage said first clutch member, and means forming a second seal member which includes a circumferentially disposed planer seal surface positioned axially inwardly from said second clutch; said second seal surface adapted to sealingly engage said first seal surface; said first clutch member is circumferentially disposed about a terminal end portion of said first elongated member and includes radially spaced apart lugs which form dogs and slots; said second clutch member is circumferentially disposed about a terminal end portion of said second elongated member and includes radially spaced-apart lugs which form dogs and slots; the dogs of one of said clutch members being received within the slots of the mating clutch member to thereby enable the clutch to transmit torsional loads in either direction of rotation, the dogs having an outermost face and the slots having an innermost face; said innermost and outermost faces being spaced apart from one another when the coupling is in the operative configuration;

a collar having means forming an inwardly directed shoulder and a threaded box therewithin with said box being spaced apart from the shoulder and adapted to threadedly engage said pin, while said shoulder engages said outwardly directed shoulder;

means forming a longitudinally disposed axially aligned passageway within said pipe coupling for flow connecting adjacent joints of the fluid conductors together; whereby:

said collar compresses said pin towards said outwardly directed shoulder to thereby compress said first and second seal members together, and to transmit tension loads between adjacent joints, while said clutch transmits torsion loads between adjacent joints in either a clockwise or counterclockwise rotational direction.

\* \* \* \* \*

UNITED STATES PATENT OFFICE
CERTIFICATE OF CORRECTION

Patent No. 3,623,753     Dated     November 30, 1971

Inventor(s)   Ralph L. Henry

It is certified that error appears in the above-identified patent and that said Letters Patent are hereby corrected as shown below:

On the cover sheet [73] "Smith International, Inc. Midland, Mich." should read -- Smith International, Inc., Drilco Division, Midland, Texas --.

Signed and sealed this 6th day of June 1972.

(SEAL)
Attest:

EDWARD M. FLETCHER, JR.
Attesting Officer

ROBERT GOTTSCHALK
Commissioner of Patents